UNITED STATES PATENT OFFICE.

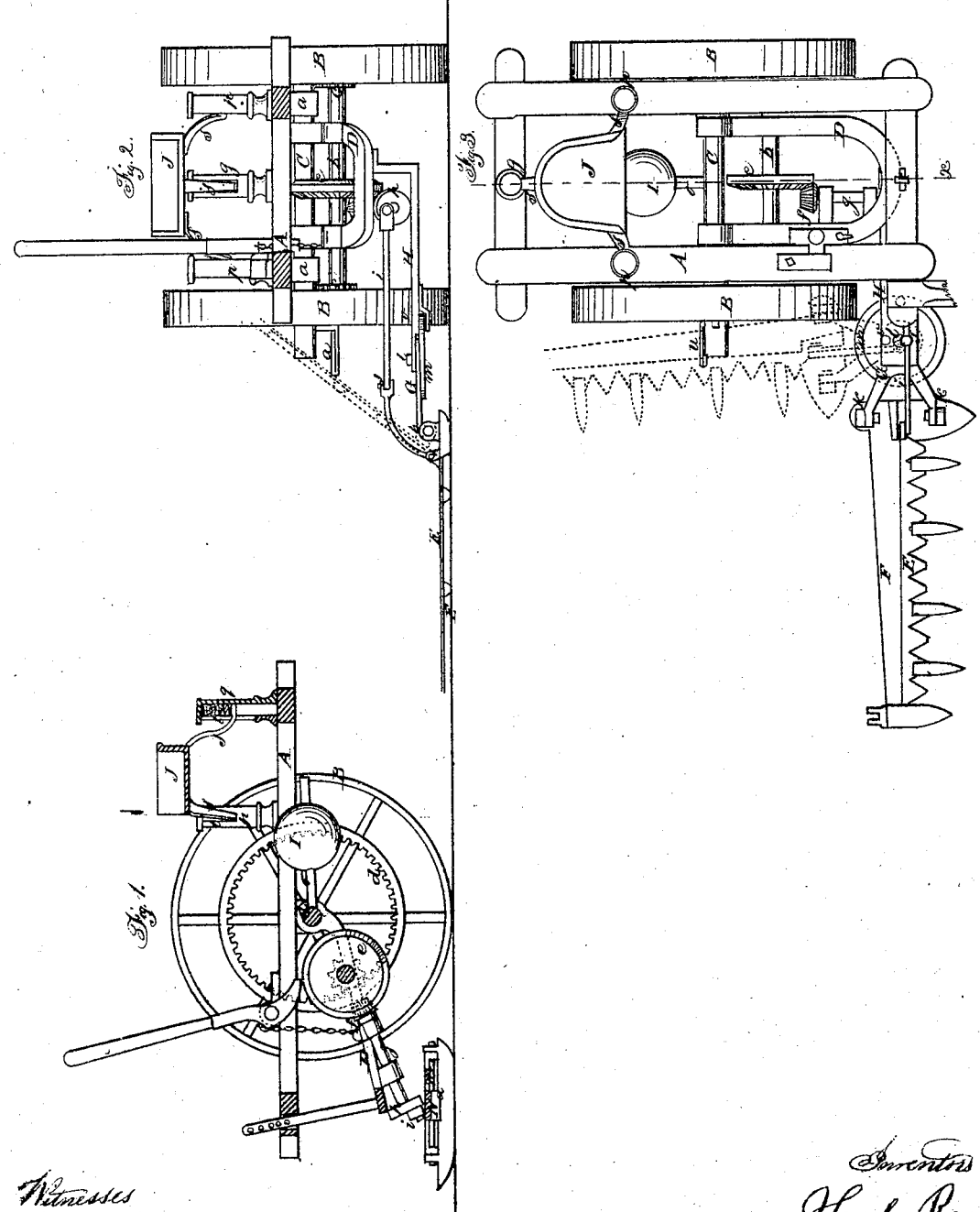

SAMUEL RAY AND MOSES R. SHALTERS, OF ALLIANCE, OHIO.

IMPROVEMENT IN HARVESTING-MACHINES.

Specification forming part of Letters Patent No. 23,707, dated April 19, 1859.

*To all whom it may concern:*

Be it known that we, SAMUEL RAY and MOSES R. SHALTERS, both of Alliance, in the county of Stark and State of Ohio, have invented a new and Improved Mowing-Machine; and we do hereby declare that the following is a full, clear, and exact description of the same, reference being had to the annexed drawings, making a part of this specification, in which—

Figure 1 is a vertical section of our invention, taken in the line $x\,x$, Fig. 3; Fig 2, a front view of the same; Fig. 3, a plan or top view of the same.

Similar letters of reference indicate corresponding parts in the several figures.

This invention consists, first, in a peculiar manner of attaching the finger-bar to the main frame of the machine, whereby the bar, when not in use, is rendered capable of being adjusted or folded up by the side of the main frame in two different positions in order to facilitate the ready transportation of the machine.

The invention also consists in a peculiar arrangement of the driver's seat, whereby a requisite degree of elasticity is given the same.

To enable those skilled in the art to fully understand and construct our invention, we will proceed to describe it.

A represents the main frame of the machine, which is mounted on two wheels, B B, said wheels being placed loosely on their axle C, which axle is also fitted loosely in its bearings $a$, at the under side of the main frame A.

To the axle C a bow-shaped bar, D, is permanently secured, and to this bar a shaft, $b$, is attached, each end of which has a pinion, $c$, on it, which pinions gear into toothed wheels $d\,d$, attached one to each wheel B. On the shaft $b$, at about its center, a toothed wheel, $e$, is placed, said wheel gearing into a pinion, $f$, on the inner end of a shaft, $g$, on the front part of the bar D. On the outer end of shaft $g$ a crank-pulley, $h$, is placed, and $i$ is a connecting-rod attached to the crank-pulley $h$, said rod driving a cutter-bar, E, which is placed on a finger-bar, F. The connecting-rod $i$ is jointed, as shown at $j$, the joint folding inward, and the inner end of the finger-bar is connected by joints $k\,k$ with a forked plate, G, which is secured by a pivot, $l$, in the outer end of a plate or bar, H, the inner end of which is firmly attached to the front end of bar D.

To the plate G a guide or bearing ring, $m$, is attached, said ring fitting in a loop, $n$, at the under side of the plate or bar H, as shown clearly in Fig. 2.

The bow-shaped bar D projects from the front side of the axle C, and from the back side a rod, $o$, projects, said rod having a weight or counterpoise, I, on it, which may slide thereon. The weight I counterpoises the finger-bar and appurtenances and enables the same to pass lightly over the ground with but little friction, thereby greatly reducing side draft as well as the direct draft.

On the back part of the main frame A three hollow standards, $p\,p\,q$, are placed, the standards $p\,p$ being on the side bars of the main frame and the standard $q$ at the center of the back cross-piece. In each standard a spiral spring, $r$, is placed, and to these springs the supports $s$ of a seat, J, are attached, the lower ends of said supports passing through vertical slots $t$ in the standards. The springs $r$ are sufficiently rigid to sustain the seat J with the driver on it, and at the same time permit of an easy-yielding movement. The springs are attached to the upper ends of the columns.

By having the finger-bar F attached to the plate G by the joints $k\,k$ it will be seen that the bar may be folded upward against the main frame A, as shown in red, Fig. 2; and it will also be seen that the finger-bar may be turned around in a folded state parallel with the side of the frame A, as shown in red, Fig. 3, the latter movement being permitted in consequence of the plate G being connected to the bar H by the pivot $l$ and the joint $j$ in the connecting-rod $i$. When the finger-bar is adjusted or folded in the latter position it rests on a hook, $u$, attached to one end of the axle C. This folding arrangement is essential, for it admits of the ready transportation of the machine from place to place, and also admits of the finger-bar being temporarily raised in order to clear obstacles or in passing through gates, &c. In the latter case the finger-bar would require only to be raised directly against the frame A, as shown in Fig. 2; but when the machine is being drawn from place to place the finger-bar should be turned and made to rest on the hook $u$, as shown in Fig. 3. The bar is prevented from casually turning by means of a pin, $v$, which passes through the plate or bar H into the plate G or ring $m$.

We do not claim broadly the attaching of the finger-bar F to the machine by means of a joint to enable the finger-bar to be raised or folded upward against the machine, for this has been previously done; but,

Having thus described our invention, what we do claim as new, and desire to secure by Letters Patent, is—

1. Attaching the finger-bar F to the machine by means of the plate G, one end of which is pivoted to the machine, as at $l$, and the other end connected with the finger-bar by joints $k\ k$, the above parts being in connection with a jointed connecting-rod, $i$, to admit of the folding and turning of the finger-bar, substantially as described.

2. Placing the driver's seat J on the spring $r$, fitted in the hollow standards $p\ p\ q$, substantially as and for the purpose set forth.

SAML. RAY.
MOSES R. SHALTERS.

Witnesses:
J. J. FAST.
ELI GRANT.